(12) United States Patent
Oh et al.

(10) Patent No.: US 8,615,045 B2
(45) Date of Patent: Dec. 24, 2013

(54) APPARATUS AND METHOD FOR PLAYOUT SCHEDULING IN VOICE OVER INTERNET PROTOCOL (VOIP) SYSTEM

(75) Inventors: Hee-Jin Oh, Suwon-si (KR); Hae-Taek Jung, Suwon-si (KR); Austin Kim, Seongnam-si (KR); Jae-Bum Kim, Seoul (KR); Min-Sung Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1446 days.

(21) Appl. No.: 12/255,996

(22) Filed: Oct. 22, 2008

(65) Prior Publication Data
US 2009/0109964 A1 Apr. 30, 2009

(30) Foreign Application Priority Data
Oct. 23, 2007 (KR) .................. 10-2007-0106620

(51) Int. Cl.
*H04B 14/04* (2006.01)
(52) U.S. Cl.
USPC ........... 375/242; 375/246; 370/429; 370/532; 370/535
(58) Field of Classification Search
None
See application file for complete search history.

(56) References Cited

U.S. PATENT DOCUMENTS

| | | | |
|---|---|---|---|
| 5,781,452 A * | 7/1998 | Lee et al. .............. | 702/190 |
| 5,790,538 A | 8/1998 | Sugar | |
| 6,484,137 B1 * | 11/2002 | Taniguchi et al. ......... | 704/211 |
| 7,830,862 B2 | 11/2010 | James | |
| 2001/0038643 A1 * | 11/2001 | McParland ............ | 370/487 |
| 2004/0010329 A1 * | 1/2004 | Lee et al. ............. | 700/94 |
| 2005/0243846 A1 | 11/2005 | Mallila | |
| 2007/0211704 A1 | 9/2007 | Lin et al. | |
| 2008/0091440 A1 * | 4/2008 | Oshikiri ............. | 704/501 |
| 2009/0109964 A1 * | 4/2009 | Oh et al. ............. | 370/352 |

FOREIGN PATENT DOCUMENTS

WO  WO 2006046547 A1 *  5/2006

OTHER PUBLICATIONS

English translation for WO2006/046547.*

\* cited by examiner

*Primary Examiner* — Andrew Chriss
*Assistant Examiner* — Salvador E Rivas
(74) *Attorney, Agent, or Firm* — The Farrell Law Firm, P.C.

(57) ABSTRACT

A method and an apparatus for playout scheduling in a Voice over Internet Protocol (VoIP) system are provided. The method includes acquiring Pulse Code Modulation (PCM) samples by decoding a received packet; setting a first scale ratio according to a length of PCM samples stored in a playout buffer based on a preset scale ratio table; setting a second scale ratio by predicting a packet delay; setting a final scale ratio using the first scale ratio and the second scale ratio; and adjusting the length of the acquired PCM samples at the final scale ratio.

10 Claims, 10 Drawing Sheets

| AREA | EXPANSION | | NORMAL | | COMPRESSION | | |
|---|---|---|---|---|---|---|---|
| | I | II | I | II | I | II | III |
| 1 | 1.8 | 1.3 | | 1.0 | 0.8 | 0.6 | |
| 2 | 1.3 | 1.0 | 0.8 | 0.8 | 0.6 | | |
| 3 | 1.0 | 0.8 | 0.6 | 0.6 | 0.5 | | |
| 4 | 0.8 | 0.6 | 0.5 | | | | |
| 5 | 0.6 | 0.5 | | | | | |
| 6 | 0.5 | | | | | | |
| $q_n^i$ | | | | | | | |

FIG.6

| AREA | EXPANSION | | NORMAL | | COMPRESSION | | |
|---|---|---|---|---|---|---|---|
| | I | II | I | II | I | II | III |
| 1 | 2.0 | 1.4 | 1.0 | 0.8 | 0.8 | 0.6 | 0.5 |
| 2 | 1.5 | 1.1 | 0.8 | 0.6 | 0.6 | 0.5 | |
| 3 | 1.2 | 0.9 | 0.6 | 0.5 | 0.5 | | |
| 4 | 1.0 | 0.7 | 0.5 | | | | |
| 5 | 0.8 | 0.6 | | | | | |
| 6 | 0.7 | | | | | | |

APPARATUS AND METHOD FOR PLAYOUT SCHEDULING IN VOICE OVER INTERNET PROTOCOL (VOIP) SYSTEM

PRIORITY

This application claims priority under 35 U.S.C. § 119(a) of a Korean patent application filed in the Korean Intellectual Property Office on Oct. 23, 2007 and assigned Serial No. 2007-106620, the entire disclosure of which is incorporated herein by reference.

BACKGROUND OF THE INVENTION

1. Field of the Invention

The present invention relates generally to an apparatus and a method for playout scheduling in a Voice over Internet Protocol (VoIP), and more particularly to an apparatus and a method for a receiver of the VoIP system to robustly handle influence of a jitter by adaptively adjusting a size of a playout buffer.

2. Description of the Related Art

Currently, transmission of time-varying multimedia such as voice and audio over an Internet Protocol (IP) network is increasing. Yet, because the jitter caused by a network delay is considerable and it is difficult to predict the jitter, an IP network using a best effort service does not guarantee Quality of Service (QoS) of the voice, which requires the real-time service. In the packet delivery over the IP network, the network delay jitter occurs because the packets arrive at a destination node through different delays.

When the packets are received after an intended playout time because of the considerable delay jitter, a user suffers discontinuous voice signal. The playout time is a time taken to receive voice packets, to convert the voice packets to a voice signal, to amplify the voice signal, and to reproduce the audio.

To address the above-mentioned shortcoming, in the related art, the receiver, which includes a playout buffer for buffering, stores the decoded voice PCM samples to the buffer; and then outputs the audio, rather than restoring and outputting the corresponding packets as the voice signal upon the reception of the packet. However, using the playout buffer, the user experiences the delay that lasts as long as the first buffering time at the initial call setup, and the playout scheduling is not conducted for the jitter variation in the process of the call. As a result, to the related art cannot actively handle the delay varying according to the condition of the network.

To avoid this problem, a method has been suggested for adaptively adjusting the playout time by predicting the jitter caused by the network delay and adjusting a size of Pulse Code Modulation (PCM) samples. Herein, the method for adjusting the playout time is referred to as a playout scheduling, and a technique for increasing or decreasing the number of the PCM samples using the characteristic of the voice for the playout scheduling is referred to as a Time Scale Modification (TSM). The TSM determines a scale ratio to increase or decrease the number of the PCM samples. The audio quality greatly depends on a performance of an algorithm of determining the scale ratio.

FIG. 1 illustrates a conventional structure for playout scheduling at a receiver of a VoIP system.

Referring to FIG. 1, the receiver measures the delay in every reception of the packet, predicts a next packet arrival time by taking statistics on delay, i.e., predicts a next packet delay $\hat{d}_n^{i+1}$ in step 101, adjusts the number of voice PCM samples received in the current packet by determining the scale ratio $S^i$ based on the predicted delay in step 103, and adjusts the playout time so that the user cannot recognize the discontinuous voice signal. Herein, the scale ratio indicates the increase or the decrease of the length of the PCM samples.

FIG. 2 is a flowchart illustrating a conventional method of a receiver for determining a playout time through delay prediction in a VoIP system.

Referring to FIG. 2, after a call is set up in step 201, the receiver checks if a packet is received in step 203. When a packet is received, the receiver checks if the packet is an i-th packet in step 205. When the packet is the i-th packet the receiver updates to wait for the (i+1)-th path in step 207, and decodes the current i-th packet in step 209 in order to acquire PCM samples of the i-th packet. The receiver predicts a reception time of die next (i+1)-th packet, i.e., predicts the (i+1)-th packet delay $\hat{d}_n^{i+1}$ in step 211, and defines the scale ratio $S^i$ of the PCM samples of the i-th packet according to the predicted delay in step 213. Herein, the scale ratio of the PCM samples of the i-th packet is determined using a ratio of the delay time of the (i+1)-th packet to the playout time of one packet.

Upon determining the scale ratio of the i-th packet, the receiver adjusts the size of the i-th packet at the determined scale ratio, i.e., adjusts the number of the PCM samples of the i-th packet in step 215, stores the adjusted PCM samples to the playout buffer in step 217, and then returns to step 203.

By contrast, when the packet is not the i-th packet in step 205, the receiver checks if the received packet is a packet after the i-th packet in step 219. When the packet is the packet after the i-th packet, the receiver stores the packet to a queuing buffer in step 221. When the packet is a packet prior to the i-th packet, the receiver discards the packet in step 223.

The receiver checks if the set call is released in step 225. When the call is not released, method returns to step 203. When the call is released, the receiver finishes this conventional process.

As discussed above, the TSM in the conventional playout scheduling method reproduces the voice signal by adjusting the playout time through the delay prediction on the next packet. However, because the delay in the IP network may abruptly change according to the condition and the jitter may increase unexpectedly, it is highly likely that the delay prediction is not conducted accurately. Consequently, it is difficult to robustly deal with the jitter variation of the IP network using the scheduling method that determines the playout time through the delay prediction.

SUMMARY OF THE INVENTION

Accordingly, the present invention has been designed to address at least the above-mentioned problems and/or disadvantages and to provide at least the advantages described below. An aspect of the present invention is to provide an apparatus and a method for playout scheduling in a VoIP system.

Another aspect of the present invention is to provide an apparatus and a method for playout scheduling to robustly deal with an influence of jitter, by adaptively adjusting voice PCM sample size of a packet stored to a playout buffer at a receiver of a VoIP system.

Another aspect of the present invention is to provide an apparatus and a method for playout scheduling using a length of PCM samples stored to a playout buffer, the number of queued packets, presence or absence of zero padding, and the number of times of staying in areas of the playout buffer for the playout scheduling at a receiver of a VoIP system.

Another aspect of the present invention is to provide an apparatus and a method for adjusting a playout time using available information within a receiver of a VoIP system.

Another aspect of the present invention is to provide an apparatus and a method for adjusting a playout time based on a receiver using only information in the receiver, without receiving any information from a transmitter or a network.

In accordance with an aspect of the present invention, a method is provided for playout scheduling at a receiver in a Voice over Internet Protocol (VoIP) system. The method includes decoding a received packet; acquiring PCM samples from the decoded packet; setting a first scale ratio according to a length of PCM samples stored in a playout buffer based on a preset scale ratio table; setting a second scale ratio by predicting a packet delay; setting a final scale ratio using the first scale ratio and the second scale ratio; and adjusting the length of the acquired PCM samples at the final scale ratio.

In accordance with another aspect of die present invention, an apparatus is provided for playout scheduling at a receiver in a VoIP system. The apparatus includes a decoder for acquiring PCM samples by decoding a received packet; a first scale ratio setter for setting a first scale ratio according to a length of PCM samples stored in a playout buffer based on a preset scale ratio table; a second scale ratio setter for setting a second scale ratio by predicting a packet delay; a final scale ratio setter for setting a final scale ratio using the first scale ratio and the second scale ratio; and a packet size regulator for adjusting the length of the acquired PCM samples at the final scale ratio.

BRIEF DESCRIPTION OF THE DRAWINGS

The above and other aspects, features, and advantages of certain exemplary embodiments the present invention will become more apparent from the following detailed description taken in conjunction with the accompanying drawings, in which:

FIG. 6 illustrates a playout buffer area and a scale ratio based on a number of queued packets at the receiver of a VoIP system according to an exemplary embodiment of the present invention;

FIG. 8 illustrates a scale ratio when zero padding occurs at a receiver of a VoIP system according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. The description includes various specific details to assist in that understanding, but the specific details are to be regarded as merely exemplary. Accordingly, those of ordinary skill in the art will recognize that various changes and modifications of the embodiments described herein can be made without departing from the scope and spirit of the invention Also, descriptions of well-known functions and constructions are omitted for clarity and conciseness.

Exemplary embodiments of the present invention provide an apparatus and a method for playout scheduling to robustly deal with influence of a jitter by adaptively adjusting a size of voice Pulse Code Modulation (PCM) samples stored to a playout buffer at a receiver of a Voice over Internet Protocol (VoIP) system. Hereinafter, a scale ratio indicates increase or decrease of a length of the PCM samples with respect to a voice packet.

Figure 1:
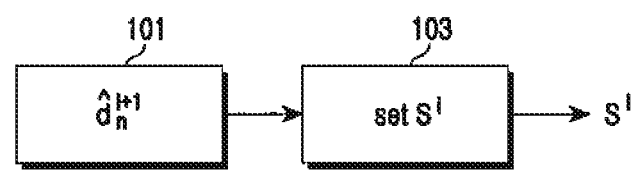
FIG. 1 illustrates a conventional structure for playout scheduling at a receiver of a VoIP system.
Figure 2:
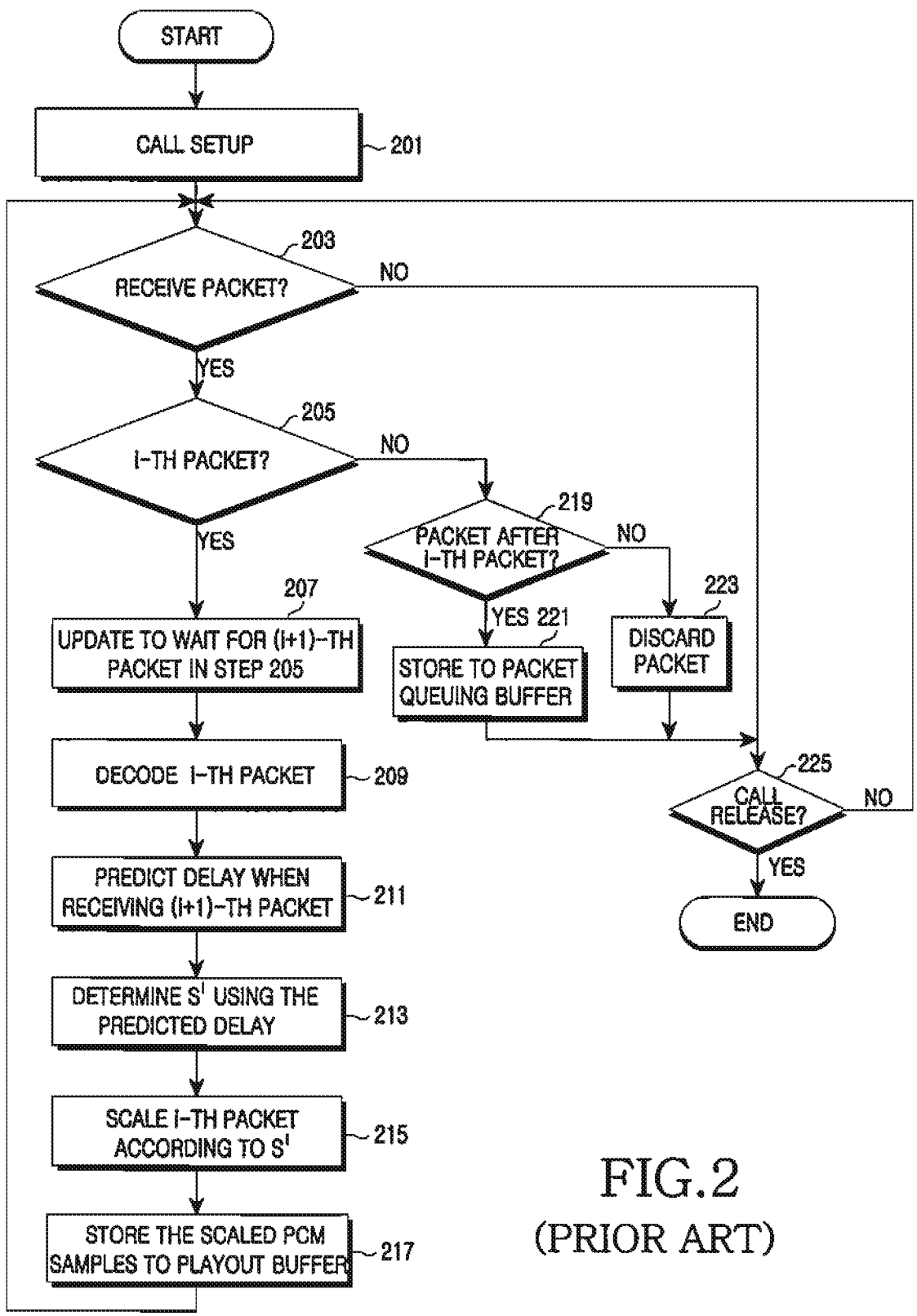
FIG. 2 illustrates a conventional method of a receiver for determining a playout time through delay prediction in a VoIP system.
Figure 3:
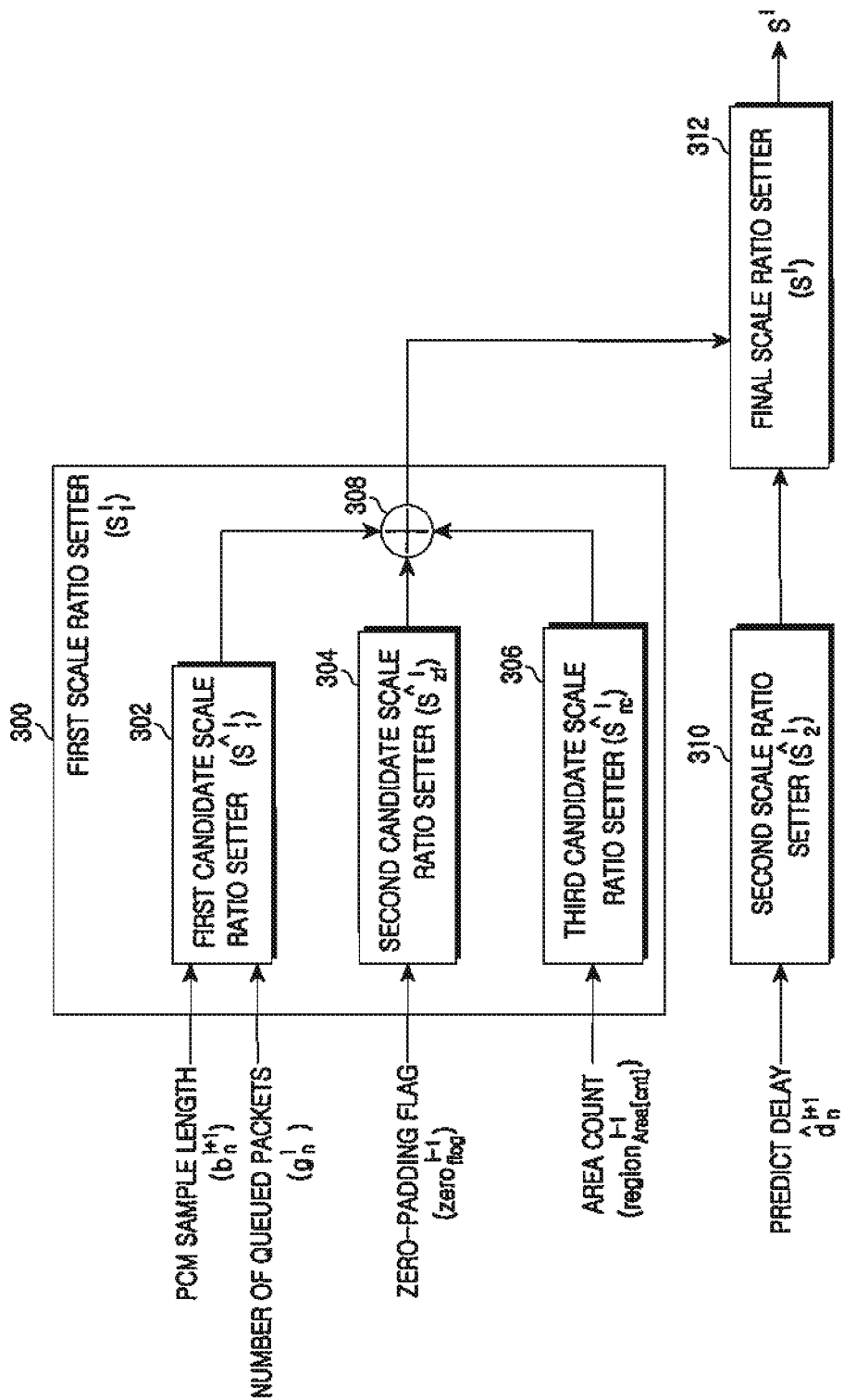
FIG. 3 illustrates a receiver for playout scheduling in a VoIP system according to an exemplary embodiment of the present invention.

FIG. 3 is a block diagram of a receiver for playout scheduling in a VoIP system according to an exemplary embodiment of the present invention.

Referring to FIG. 3, the receiver includes a first scale ratio setter 300, a second scale ratio setter 310, and a final scale ratio setter 312. The first scale ratio setter 300 includes a first candidate scale ratio setter 302, a second candidate scale ratio setter 304, a third candidate scale ratio setter 306, and a combiner 308.

The first scale ratio setter 300, which includes the first candidate scale ratio setter 302, the second candidate scale ratio setter 304, the third candidate scale ratio setter 306, and the combiner 308, determines a first scale ratio $S_1^i$ based on a length of PCM samples $b_n^i$ stored to a playout buffer, the number of queued packets $q_n^i$, presence or absence of zero padding $zero_{flag}^{i-1}$, and the number of packets staying in the same area of the playout buffer $region_{AREA[cnt]}^{i-1}$.

More specifically, the first candidate scale ratio setter 302 sets a first candidate scale ratio $\hat{S}_1^i$ using the length of the PCM samples $b_n^i$ stored to the playout buffer and the number of the queued packets $q_n^i$. The first candidate scale ratio setter 302 confirms the length of the PCM samples $b_n^i$ stored to the playout buffer, identifies an area filled with the PCM samples in the playout buffer as illustrated in FIG. 5 and will be described below, and sets the first candidate scale ratio $\hat{S}_1^i$ based on the identified area and the number of the queued packets $q_n^i$ as illustrated in FIG. 6 and will be described below.

For example, when the number of the queued packets $q_n^i$ is 1 and the length of the PCM samples $b_n^i$ corresponds to an expansion area I of the playout buffer, the first candidate scale ratio setter 302 sets the scale ratio to 1.8. When the length of the PCM samples $b_n^i$ corresponds to a compression area II of the playout buffer, the first candidate scale ratio setter 302 sets the scale ratio to 0.6. Herein, the number of the queued packets $q_n^i$ is 1 when a packet arrives at a constant rate and the jitter is zero or close to zero.

Figure 5:
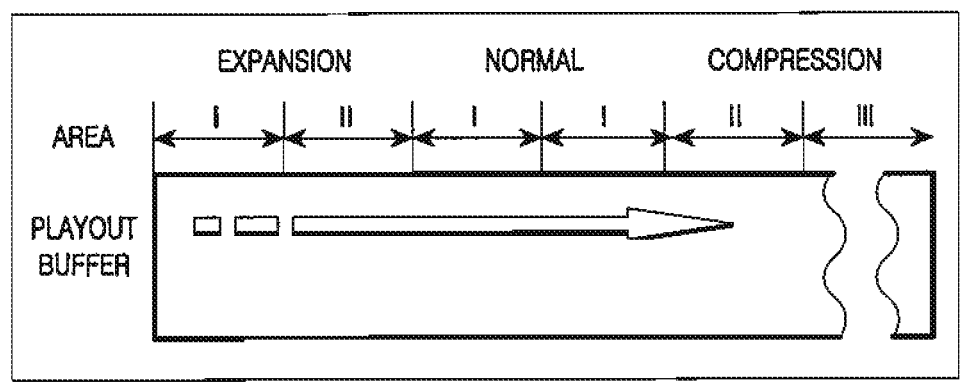
FIG. 5 illustrates a playout buffer area based on a length of PCM samples at a receiver of a VoIP system according to an exemplary embodiment of the present invention.

Referring to FIG. 5, the playout buffer is divided into two expansion areas, one normal area, and three compression areas, which may vary according to situation and purpose.

The expansion area is a region that may go through underflow in the abrupt delay variation. The expansion area increases the length $b_n^i$ of the PCM samples stored to the playout buffer by setting the corresponding scale ratio greater than 1. In doing so, the scale ratio for the expansion area I is higher than that of the expansion area II in order to avoid the underflow in the playout buffer by fully ensuring the length of the PCM samples $b_n^i$ stored to the playout buffer within a shorter time in relation to the shorter length of the PCM samples stored to the playout buffer.

The compression area is a region having the sufficient PCM sample length $b_n^i$. The compression area reduces the PCM sample length $b_n^i$ by setting the corresponding scale ratio smaller than 1, to prevent an increase of the playout delay. The compression area is divided into three subareas. The smaller scale ratio is applied to the later subarea in order to avoid the increase of the playout delay by decreasing the length $b_n^i$ of the PCM samples stored to the playout buffer within a shorter time in relation to the longer PCM samples stored to the playout buffer.

The normal area is a region determined to be able to robustly handle the delay jitter variation and to have an appropriate playout delay. The normal area prevents the deterioration of the audio quality by setting the corresponding scale ratio to 1 so as not to adjust the PCM sample size of the actually input packet.

Referring now to FIG. 6, the scale ratio differs depending on the area of the playout buffer and the number of the queued packets $q_n^i$. When the delay variation of the network causes too much packets fed to the receiver, i.e., when the number of the queued packets $q_n^i$ exceeds 1 and is increasing by degrees, the playout buffer may increase as processing the packets. When the number of the queued packets $q_n^i$ increases, the abrupt increase of the playout buffer can be prevented by gradually lowering the scale ratio.

Herein, the values of the scale ratio illustrated in FIG. 6 are mere examples and changeable if necessary. In this exemplary embodiment of the present invention, the scale ratio is set to 1.8 at maximum and to 0.5 at minimum, because the deterioration of the audio quality gets worse when the scale ratio exceeds 2.0 (hereinafter, referred to as a $S_{max}$) or falls below 0.5 (hereafter, referred to as a $S_{min}$) in experiments. The maximum scale ratio $S_{max}$ is set to 1.8, rather than 2.0, because the scale ratio may increase depending on the zero padding $zero_{flag}^{i-1}$ or the number of the packets staying in the same area of the playout buffer.

The second candidate scale ratio setter 304 determines a second candidate scale ratio $\hat{S}_{zf}^i$ based on the presence or absence of the zero padding $zero_{flag}^{i-1}$. The zero padding can occur when the delay of the network suddenly increases and the packet arrives behind the expected playout time. Upon detecting the zero padding, the second candidate scale ratio setter 304 predicts the increase of the network delay and sets the second candidate scale ratio $\hat{S}_{zf}^i$ to increase the scale ratio.

When the zero padding occurs after the playout scheduling of the (i−1)-th packet, the second candidate scale ratio setter 304 sets the zero flag $zero_{flag}^{i-1}$ of the (i−1)-th packet to 'ON', and sets the second candidate scale ratio $\hat{S}_{zf}^i$ by confirming the area corresponding to the length of the PCM samples $b_n^i$ stored to the playout buffer. When the area corresponding to the PCM sample length $b_n^i$ is the expansion area I or the expansion area II, the second candidate scale ratio setter 304 sets the second candidate scale ratio $\hat{S}_{zf}^i$ to a preset positive value.

When the area corresponding to the PCM sample length $b_n^i$ is the expansion area I, the value INC_EXP1_ZP determined as the second candidate scale ratio $\hat{S}_{zf}^i$ is greater than the value INC_EXP2_ZP determined as the second candidate scale ratio $\hat{S}_{zf}^i$ for the expansion area II. This avoids the audio quality deterioration by applying the smaller scale ratio because the incidence of the zero padding decreases when the PCM samples correspond to the expansion area II, compared to the expansion area I. INC_EXP1_ZP is greater than zero and less than or equal to 0.2. INC_EXP1_ZP is greater than zero in order to avoid no operation in case of the zero padding. INC_EXP1_ZP is less than or equal to 0.2 so that the first scale ratio $\hat{S}_1^i$ does not exceed 2.0. In other words, INC_EXP1_ZP is smaller than 0.2 so that the sum of the first candidate scale ratio $\hat{S}_1^i$ and the second candidate scale ratio $\hat{S}_{zf}^i$ does not exceed 2.0 as illustrated in FIG. 8 and will be described below.

When the area corresponding to the PCM sample length $b_n^i$ is the normal area, the second candidate scale ratio setter 304 determines that the sufficient PCM length is ensured, and aborts the scale ratio supplement according to the previous zero padding by setting the zero flag $zero_{flag}^{i-1}$, to 'OFF'.

When the zero padding occurs after the processing of the (i−1)-th packet, the playout buffer is empty at the point of the processing of the i-th packet. Therefore, when the zero padding occurs, the PCM sample length $b_n^i$ corresponds to the expansion area I, then corresponds to the expansion area II due to the expansion to continuous packets, and finally corresponds to the normal area.

The third candidate scale ratio setter 306 determines a third candidate scale ratio $\hat{S}_{rc}^i$ based on the number of packets $region_{AREA[cnt]}^{i-1}$ staying in the same area of the playout buffer. As the PCM sample length $b_n^i$ stays in the expansion area longer, the probability of causing the underflow in the playout buffer increases and the audio quality can deteriorate at a higher scale ratio. As the PCM sample length $b_n^i$ stays in the compression area longer, the playout delay increases and the audio quality can deteriorate at a low scale ratio. Thus, the third candidate scale ratio setter 306 sets and modifies the third candidate scale ratio $\hat{S}_{rc}^i$ to lower the probability of staying in the expansion area and the compression area, and to make the fast transition to the normal area.

The third candidate scale ratio setter 306 counts the number of packets $region_{AREA[cnt]}^{i-1}$ staying in the same area of the playout buffer in every packet processing. When the count is greater than zero, the third candidate scale ratio setter 306 identifies the area of the playout buffer corresponding to the PCM sample length $b_n^i$, sets a weight according to the identified area, and determines the third candidate scale ratio $\hat{S}_{rc}^i$ by multiplying the count by the weight. Accordingly, weights for the expansion areas I and II are positive, weights for the compression areas I and II are negative, and weights for the normal area and the compression area 1:1:1 are zero. Herein, the weight for the normal area is set to zero to prevent adjusting the PCM sample size for the corresponding packet, The weight for the compression area III is set to zero in order to prevent reducing the scale ratio any more because the scale ratio for the compression area III is equal to $S_{min}$ 0.5.

When the PCM sample length $b_n^i$ increases and accordingly the area of the playout buffer corresponding to the PCM sample length $b_n^i$ is changed, the third candidate scale ratio setter 306 resets a count $region_{PREV-AREA[cnt]}^i$ of the previous area of the i-th packet to zero and increases a count $region_{CURR-AREA[cnt]}^i$ of a new area in every packet processing.

In further detail, the third candidate scale ratio setter 306 identifies a playout buffer area of the PCM sample length $b_n^i$ and sets the third candidate scale ratio $\hat{S}_{rc}^i$ by counting the number of packets staying in the same area. For example, when the area CURR_AREA corresponding to the PCM sample length $b_n^i$ of the i-th packet is equal to the area PRE- V_AREA corresponding to the PCM sample length $b_n^{i-1}$ of the (i−1)-th packet, the count region$_{CURR\text{-}AREA[cnt]}^{i-1}$ of the current area of the (i−1)-th packet exceeds zero. When the PCM sample length $b_n^i$ of the i-th packet and the PCM sample length $b_n^{i-1}$ of the (i−1)-th packet lie in different areas, it reaches a new area. Accordingly, the third candidate scale ratio setter 306 resets the count region$_{PREV\text{-}AREA[cnt=0]}^i$ of the previous area of the i-th packet to zero and increases the count region$_{CURRAREA[cnt++]}^i$ of the current area of the i-th packet.

The combiner 308 sets the first scale ratio St by summing the first, second, and third candidate scale ratios $\hat{S}_1^i$, $\hat{S}_{zf}^i$ and $\hat{S}_{rc}^i$ determined at the first candidate scale ratio setter 302, the second candidate scale ratio setter 304, and the third candidate scale ratio setter 306, based on Equation (1) below.

$$S_1^i = \hat{S}_1^i + \hat{S}_{zf}^i + \hat{S}_{rc}^i \quad (1)$$

The main factor for setting the first scale ratio $S_1^i$ is the first candidate scale ratio $\hat{S}_1^i$. The second candidate scale ratio $\hat{S}_{zf}^i$ and the third candidate scale ratio $\hat{S}_{rc}^i$ are used to modify the first scale ratio $S_1^i$ according to the zero padding and the area corresponding to the PCM sample length $b_n^i$.

The second scale ratio setter 310 measures the delay in every packet reception, takes statistics on the delay, and sets a second scale ratio $S_2^i$ by predicting a delay of the next packet. The second scale ratio setter 310 determines the second scale ratio $S_2^i$ for the PCM samples of the i-th packet by calculating a ratio of the delay time of the (i+1)-th packet to the playout time size of one packet as expressed below in Equation (2). Accordingly, the delay prediction algorithm can employ various conventional algorithms of high performance in predicting the delay of the network.

$$S_2^i = \frac{\hat{d}_n^{i+1}}{PACKET\text{-}SIZE} \quad (2)$$

In Equation (2), $S_2^i$ denotes the second scale ratio of the i-th packet, $\hat{d}_n^{i+1}$ denotes the predicted delay of the (i+1)-th packet, and PACKET-SIZE denotes a temporal size of the voice PCM samples in one VoIP packet.

The final scale ratio setter 312 determines a final scale ratio $S^i$ using the first scale ratio $S_1^i$ and the second scale ratio $S_2^i$ determined at the first scale ratio setter 300 and the second scale ratio setter 310. To determine the final scale ratio $S^i$, the final scale ratio setter 312 applies weights to the first scale ratio $S_1^i$ and the second scale ratio $S_2^i$, respectively, and stuns the weighted values based on Equation (3).

$$S^i = \alpha \times S_1^i + (1-\alpha) \times S_2^i \quad (3)$$

In Equation (3), $S^i$ denotes the final scale ratio, $\alpha$ denotes a weight, $S_1^i$ denotes the first scale ratio, and $S_2^i$ denotes the second scale ratio. The weight $\alpha$ is greater than zero and less than or equal to 1.

The final scale ratio setter 312 makes the final scale ratio $S^i$ acquired from Equation (3) an integer $S^i = int(S^i)$.

The final scale ratio setter 312 compares the final scale ratio $S^i$ acquired from Equation (3) with $S_{max}$ and $S_{min}$. When the acquired final scale ratio $S^i$ is greater than $S_{max}$, the final scale ratio setter 312 determines $S_{max}$ as the final scale ratio $S^i$, instead of the acquired value. When the acquired final scale ratio $S^i$ is less than $S_{min}$, the final scale ratio setter 312 determines $S_{min}$ as the final scale ratio $S^i$, instead of the acquired value.

Although not depicted in FIG. 3 for ease of explanation, the receiver further includes a decoder for acquiring the PCM samples by decoding the packet, and a packet size regulator for increasing or decreasing the size of the PCM samples based on the finally acquired scale ratio $S^i$.

Figure 4:
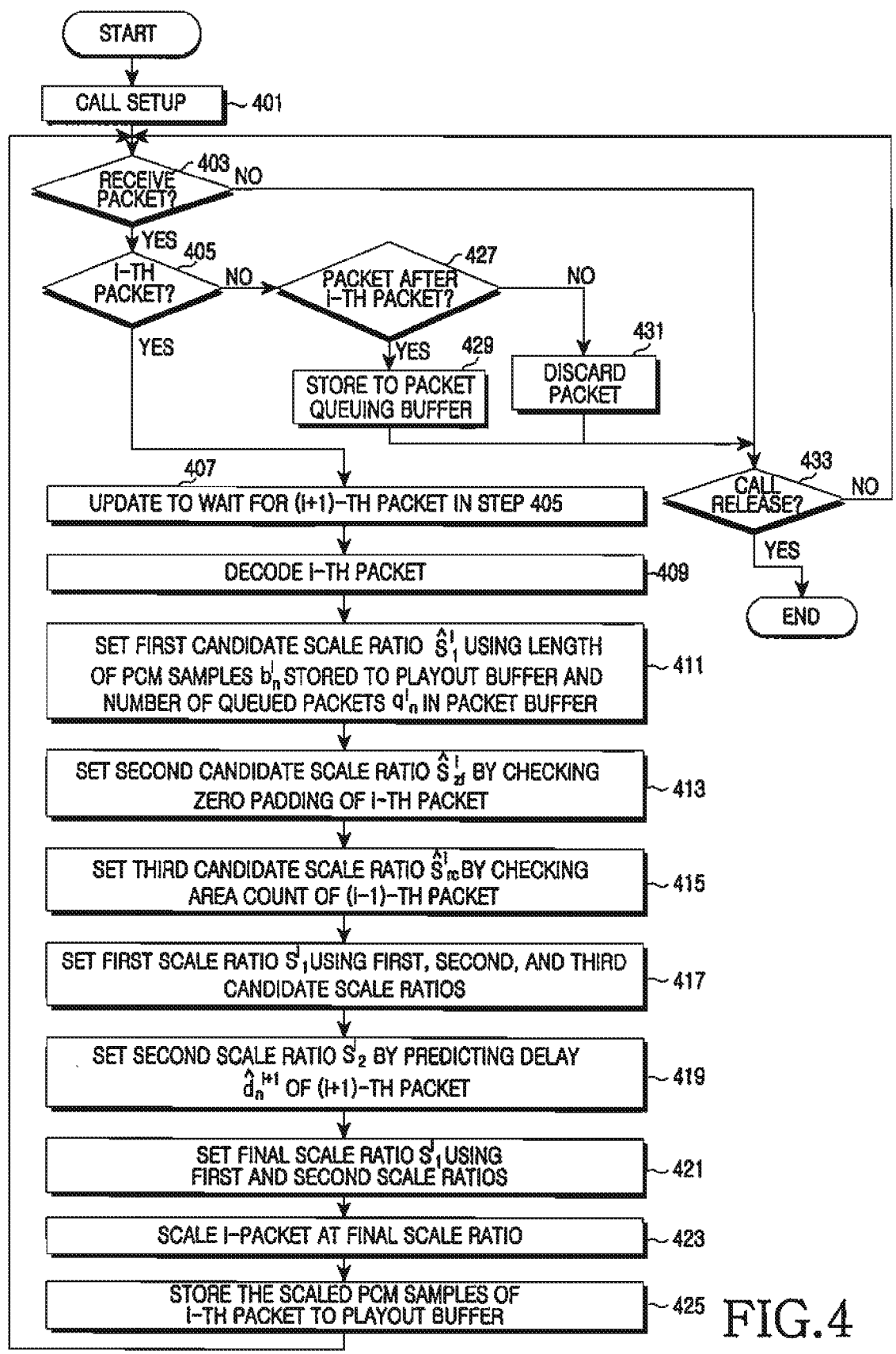
FIG. 4 illustrates a playout scheduling method of a receiver in a VoIP system according to an exemplary embodiment of the present invention.

FIG. 4 illustrates a playout scheduling method of a receiver in a VoIP system according to an exemplary embodiment of the present invention.

When the call is set up in step 401, the receiver checks if a packet is received in step 403. When receiving the packet, the receiver checks if the packet is the i-th packet in step 405. When the packet is the i-th packet, the receiver updates to wait for the (i+1)-th packet in step 407, and acquires the PCM samples by decoding the currently received i-th packet in step 409.

In step 411, the receiver sets the first candidate scale ratio $\hat{S}_1^i$ using the length of the PCM samples $b_n^i$ stored in the playout buffer and the number of the queued packets $q_n^i$ in the packet buffer. More specifically, the receiver confirms the length of the PCM samples $b_n^i$ stored in the playout buffer, identifies an area filled with the PCM samples in the playout buffer as illustrated in FIG. 5, and sets the first candidate scale ratio $\hat{S}_1^i$ based on the identified area and the number of the queued packets $q_n^i$ as illustrated in FIG. 6.

In step 413, the receiver sets the second candidate scale ratio $\hat{S}_{zf}^i$ by checking for the zero padding zero$_{flag}^{i-1}$ of the i-th packet, which will be described in more detail in FIG. 7 below.

In step 415, the receiver checks in each packet reception if the current packet lies in a same area as a previous packet in the playout buffer, and sets the third candidate scale ratio $\hat{S}_{rc}^i$ by counting the number of packets region$_{AREA[cnt]}^{i-1}$ in the same area. As the PCM sample length $b_n^i$ stays in the expansion area longer, the probability of causing the underflow in the playout buffer increases and the audio quality can deteriorate at a higher scale ratio. As the PCM sample length $b_n^i$ stays in the compression area longer, the playout delay increases and the audio quality can deteriorate at a low scale ratio. Thus, the receiver sets the third candidate scale ratio $\hat{S}_{rc}^i$ to lower the number of packets in the expansion area and the compression area. A method of setting the third candidate scale ratio $\hat{S}_{rc}^i$ will be explained in more detail by referring to FIG. 9.

In step 417, the receiver sets the first scale ratio $S_1^i$ by summing the first, second, and third candidate scale ratios $\hat{S}_1^i$, $\hat{S}_{zf}^i$ and $\hat{S}_{rc}^i$ as shown in Equation (1).

In step 419, the receiver sets the second scale ratio $S_2^i$ of the i-th packet using Equation (2) by predicting the delay of the (i+1)-th packet.

Thereafter, the receiver sets the final scale ratio $S^i$ by applying the weights to the first scale ratio $S_1^i$ and the second scale ratio $S_2^i$, respectively, based on Equation (3), in step 421, adjusts the PCM sample length $b_n^i$ of the i-th packet according to the set final scale ratio $S^i$ in step 423, and stores the adjusted PCM samples to the playout buffer in step 425. Thereafter, the method returns to step 403.

By contrast, when the packet is not the i-th packet in step 405, the receiver if whether the received packet is a packet after the i-th packet in step 427. When the packet is the packet after the i-th packet, the receiver stores the packet to the queuing buffer in step 429. When the packet is a packet before the i-th packet, the receiver discards the packet in step 431.

In step 433, the receiver checks if the set call is released. When the call is not released, the method returns to step 403. When the set call is released, the receiver finishes the process.

While the first, second, and third candidate scale ratios $\hat{S}_1^i$, $\hat{S}_{zf}^i$, and $\hat{S}_{rc}^i$, the first scale ratio $S_1^i$ and the second scale ratio $S_2^i$ are acquired in that order for the final scale ratio $S^i$ in FIG. 4, the scale ratios can be determined at the same time and the order of the scale ratios can vary.

Figure 7:
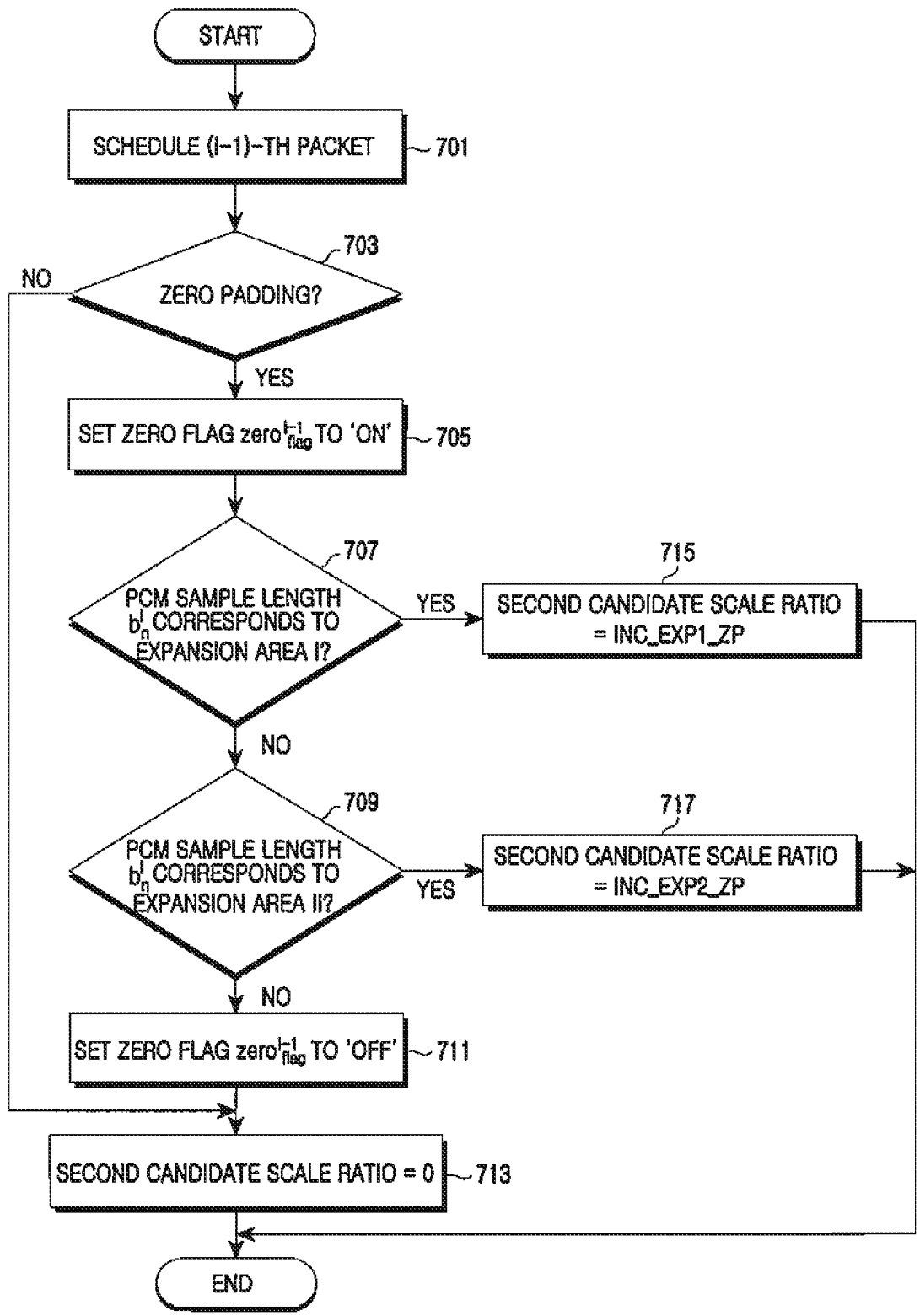
FIG. 7 illustrates a method for determining a scale ratio according to zero padding at a receiver of a VoIP system according to an exemplary embodiment of the present invention.

FIG. 7 illustrates a method for determining a scale ratio according to zero padding at a receiver of a VoIP system according to an exemplary embodiment of the present invention.

Referring to FIG. 7, the receiver schedules the (i−1)-th packet in step 701 and checks if zero padding occurs in step 703. Herein, the zero padding can occur when the delay of the network suddenly increases and the packet arrives behind the expected playout time.

When the zero padding occurs, the receiver sets the zero flag $zero_{flag}^{i-1}$ of the (i−1)-th packet to 'ON' in step 705.

In step 707, the receiver checks if the PCM sample length $b_n^i$ stored in the playout buffer corresponds to the expansion area I of the playout buffer. When PCM sample length $b_n^i$ corresponds to the expansion area I, the receiver sets the second candidate scale ratio $\hat{S}_{zf}^i$ according to the zero padding $zero_{flag}^{i-1}$ to the preset INC_EXP1_ZP in step 715 and then finishes the process.

When the PCM sample length $b_n^i$ does not correspond to the expansion area I in step 707, the receiver checks if the PCM sample length $b_n^i$ stored in the playout buffer corresponds to the expansion area II in step 709. For the expansion area II, the receiver sets the second candidate scale ratio $\hat{S}_{zf}^i$ according to the zero padding $zero_{flag}^{i-1}$ to the preset INC_EXP2_ZP in step 717 and then finishes the process.

INC_EXP1_ZP is greater than the INC_EXP2_ZP. When the PCM samples correspond to the expansion area II, the probability of generating the zero padding decreases, compared to the expansion area II. Thus, applying the smaller scale ratio prevents the audio quality degradation. INC_EXP1_ZP and INC_EXP2_ZP are positive values, and INC_EXP1_ZP is greater than zero and less than or equal to 0.2.

By contrast, when the PCM sample length $b_n^i$ does not correspond to the expansion area II in step 709, i.e., when the PCM sample length $b_n^i$ reaches the normal area, the receiver sets the zero flag $zero_{flag}^{i-1}$ to 'OFF' by determining the sufficient PCM samples $b_n^i$ guaranteed in step 711, sets the second candidate scale ratio $\hat{S}_{zf}^i$ to zero in step 713, and then finishes the process.

When the zero padding does not occur in step 703, the receiver sets the second candidate scale ratio $\hat{S}_{zf}^i$ to zero in step 713 and finishes the process.

Figure 9:
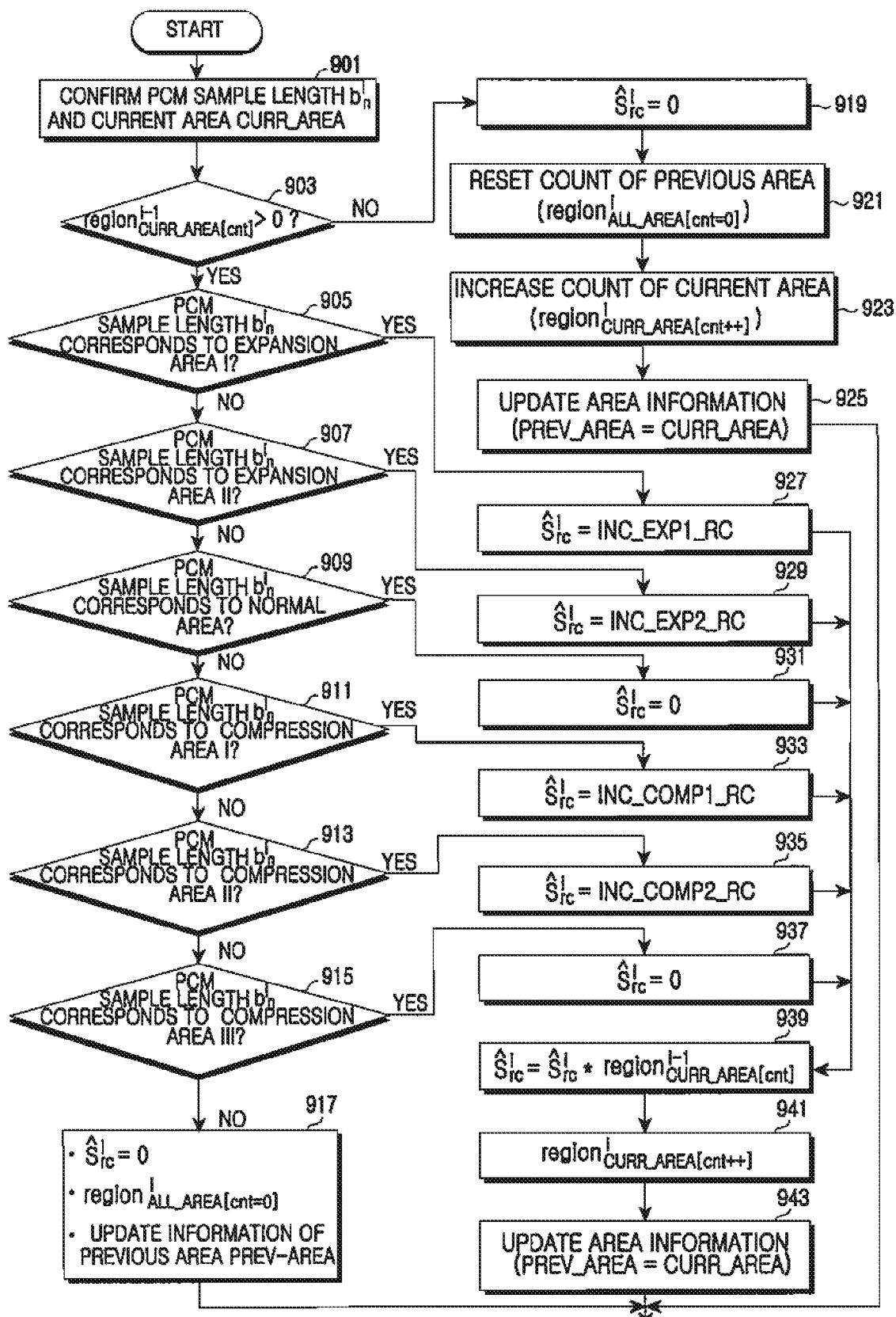
FIG. 9 illustrates a method for determining a scale ratio based on a playout buffer area at a receiver of a VoIP system according to an exemplary embodiment of the present invention.

FIG. 9 illustrates a method for determining a scale ratio based on a playout buffer area at a receiver of a VoIP system according to an exemplary embodiment of the present invention.

Referring to FIG. 9, in step 901, the receiver confirms the PCM sample length $b_n^i$ stored in the playout buffer and the current area CURR_AREA of the playout buffer corresponding to the PCM sample length $b_n^i$.

In step 903, the receiver checks if the current area count $region_{CURR\text{-}AREA[cnt]}^{i-1}$ of the (i−1)-th packet is greater than zero. When the count is not greater than zero, i.e., when the count is equal to zero, the receiver sets the third candidate scale ratio $\hat{S}_{rc}^i$ to zero by determining that the area of the current packet is different from the area of the previous packet in step 919, and resets the count $region_{PREV\text{-}AREA[cnt]}^i$ of the previous area of the i-th packet to zero in step 921. Next, the receiver increases the count $region_{CURR\text{-}AREA[cnt]}^{i-1}$ of the current area of the i-th packet in step 923, updates the current area with the previous area PREV_AREA=CURR_AREA in step 925, and then finishes the process.

However, when the count is greater than zero in step 903, the receiver determines that the area of the current packet matches the area of the previous packet and checks if the PCM sample length $b_n^i$ stored in the playout buffer corresponds to the expansion area I in step 905. When $b_n^i$ corresponds to the expansion area I, the receiver sets the third candidate scale ratio $\hat{S}_{rc}^i$ to INC_EXP1_RC in step 927 and resets the third candidate scale ratio $\hat{S}_{rc}^i$ by multiplying the set third candidate scale ratio $\hat{S}_{rc}^i$ by the current area count $region_{CURR\text{-}AREA[cnt]}^{i-1}$ of the (i−1)-th packet in step 939. Thereafter, the receiver increases the current area count $region_{CURR\text{-}AREA[cnt]}^i$ of the i-th packet in step 941, updates the area information in step 943, and then finishes the process.

When the PCM sample length $b_n^i$ does not correspond to the expansion area I in step 905, die receiver checks if the PCM sample length $b_n^i$ corresponds to the expansion area II in step 907. When the PCM sample length $b_n^i$ corresponds to the expansion area II, the receiver sets the third candidate scale ratio 4 to INC_EXP2_RC in step 929 and resets the third candidate scale ratio $\hat{S}_{rc}^i$ by multiplying the set third candidate scale ratio $\hat{S}_{rc}^i$ by the current area count $region_{CURR\text{-}AREA[cnt]}^{i-1}$ of the (i−1)-th packet in step 939. Thereafter, the process proceeds to step 941.

When the PCM sample length $b_n^i$ does not correspond to the expansion area II in step 907, the receiver checks if the PCM sample length $b_n^i$ corresponds to the normal area in step 909. When the PCM sample length $b_n^i$ corresponds to the normal area, the receiver sets the third candidate scale ratio $\hat{S}_{rc}^i$ to zero in step 931 and resets the third candidate scale ratio $\hat{S}_{rc}^i$ by multiplying the set third candidate scale ratio $\hat{S}_{rc}^i$ by the current area count $region_{CURR\text{-}AREA[cnt]}^{i-1}$ of the (i−1)-th packet in step 939. Next, the process proceeds to step 941.

When the PCM sample length $b_n^i$ does not correspond to the normal area in step 909, the receiver checks if the PCM sample length $b_n^i$ corresponds to the compression area I in step 911. When the PCM sample length $b_n^i$ corresponds to the compression area I, the receiver sets the third candidate scale ratio $\hat{S}_{rc}^i$ to INC_COMP1_RC in step 933 and resets the third candidate scale ratio $\hat{S}_{rc}^i$ by multiplying the set third candidate scale ratio $\hat{S}_{rc}^i$ by the current area count $region_{CURR\text{-}AREA[cnt]}^{i-1}$ of the (i−1)-th packet in step 939. Next, the process proceeds to step 941.

When the PCM sample length $b_n^i$ does not correspond to the compression area I in step 911, the receiver checks if the PCM sample length $b_n^i$ corresponds to the compression area II in step 913. When the PCM sample length $b_n^i$ corresponds to the compression area II, the receiver sets the third candidate scale ratio $\hat{S}_{rc}^i$ to INC_COMP2_RC in step 935 and resets the third candidate scale ratio $\hat{S}_{rc}^i$ by multiplying the set third candidate scale ratio $\hat{S}_{rc}^i$ by the current area count $region_{CURR\text{-}AREA[cnt]}^{i-1}$ of the (i−1)-th packet in step 939, Next, the process proceeds to step 941.

When the PCM sample length $b_n^i$ does not correspond to the compression area II in step 913, the receiver checks if the PCM sample length $b_n^i$ corresponds to the compression area III in step 915. When the PCM sample length $b_n^i$ corresponds to the compression area III, the receiver sets the third candidate scale ratio $\hat{S}_{rc}^i$ to zero in step 937 and resets the third candidate scale ratio $\hat{S}_{rc}^i$ by multiplying the set third candidate scale ratio $\hat{S}_{rc}^i$ by the current area count $region_{CURR\text{-}AREA[cnt]}^{i-1}$ of the (i−1)-th packet in step 939. Next, the process proceeds to step 941.

Herein, INC_EXP1_RC, INC_EXP2_RC, INC_COMP1_RC, and INC_COMP2_RC are the weights applied to the third candidate scale ratio $\hat{S}_{rc}^i$. INC_EXP1_RC and the INC_EXP2_RC are positive values, and INC_COMP1_RC and INC_COMP2_RC are negative values. For example, INC_EXP1_RC and the INC_EXP2_RC can be set to 0.05, and INC_COMP1_RC and INC_COMP2_RC can be set to −0.05. The weight on the normal area is set to zero in order to not adjust the packet size in the normal area. The weight on the compression area III is set to zero not to further reduce the scale ratio because the weight on the compression area III is the minimum value $S_{min}$.

When the PCM sample length $b_n^i$ does not correspond to the compression area III in step 915, the receiver sets the third candidate scale ratio $\hat{S}_{rc}^i$ to zero, sets the count region$_{ALL-AREA[cnt]}^i$ of every area of the i-th packet to zero, and updates the information of the previous area in step 917. Next, the receiver finishes this process. Herein, step 917 is performed to cope with the abnormal situation in the case where the PCM sample length $b_n^i$ corresponds to none of the areas of the playout buffer.

Figure 10:
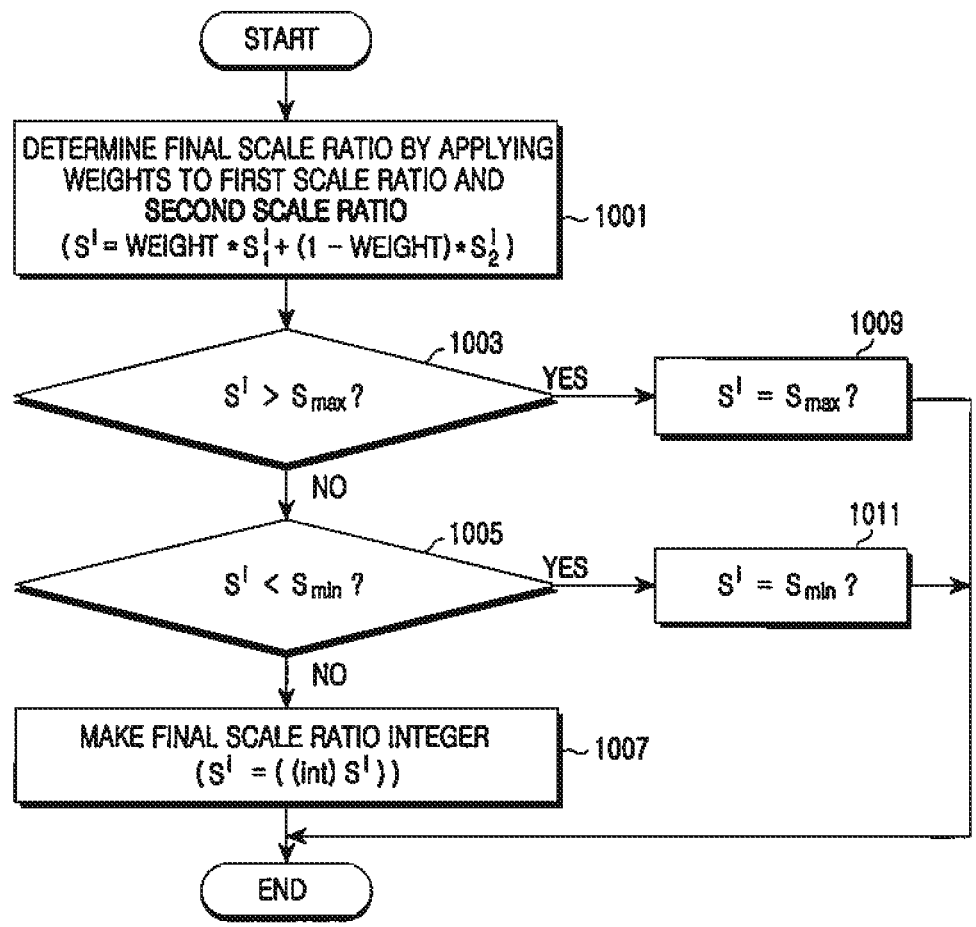
FIG. 10 illustrates a method for determining a final scale ratio at a receiver of a VoIP system according to an exemplary embodiment of the present invention.

FIG. 10 illustrates a method for determining a final scale ratio at a receiver of a VoIP system according to an exemplary embodiment of the present invention.

In step 1001, the receiver acquires the final scale ratio $S^i$ by applying weights to the first scale ratio $S_1^i$ and the second scale ratio $S_2^i$, respectively, based on Equation (3).

In step 1003, the receiver compares the acquired final scale ratio $S^i$ with $S_{max}$. Wen the acquired final scale ratio $S^i$ is greater than $S_{max}$, the receiver determines $S_{max}$ as the final scale ratio $S^i$ in step 1009.

When the acquired final scale ratio $S^i$ is not greater than $S_{max}$, the receiver compares the acquired final scale ratio $S^i$ with $S_{min}$ in step 1005. When the acquired final scale ratio $S^i$ is less than $S_{min}$, the receiver determines $S_{min}$ as the final scale ratio $S^i$ in step 1011.

However, when the acquired final, scale ratio $S^i$ is not less than $S_{min}$ in step 1005, the receiver makes the acquired final scale ratio $S^i$ an integer $S^i=\text{int}(S^i)$ in step 1007.

As described above, a scheduling method using a length of PCM samples stored in a playout buffer and a number of queued packets can realize a practical scheduling based on guaranteed resources, compared to the conventional method.

The scale ratio setting method for increasing and decreasing the packet size to adjust the playout time is compatible with various conventional time scale modification methods, which suggest how to increase and decrease the packet size based on the scale ratio.

In addition, because the information required for setting the scale ratio can be attained within the receiver, the playout scheduling is accomplished without receiving any information from the transmitter or the network.

The receiver of the VoIP system adjusts the playout time by modifying the size of the voice PCM samples based on the predicted delay of the next packet, the length of the PCM samples stored in the playout buffer, the number of the queued packets, the presence or absence of the zero padding, and the number of times staying in the same area of the playout buffer. Therefore, even with the inaccurate delay predicted for the next packet, the discontinuous voice signal can be mitigated by robustly dealing with the jitter. The packet size stored in the playout buffer can be adaptively adjusted and the capability for handling the underflow in the playout buffer can be increased. As the playout delay, which is an important index of the QoS in the real-time service, is adaptively regulated, the QoS can be enhanced.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for playout scheduling at a receiver in a Voice over Internet Protocol (VoIP) system, the method comprising:
    decoding a received packet;
    acquiring Pulse Code Modulation (PCM) samples from the decoded packet;
    setting a first scale ratio according to a length of PCM samples stored in a playout buffer based on a preset scale ratio table;
    setting a second scale ratio by predicting a packet delay;
    setting a final scale ratio using the first scale ratio and the second scale ratio; and
    adjusting a length of the acquired PCM samples at the final scale ratio.

2. The method of claim 1, wherein the scale ratio table defines a higher scale ratio for a shorter length of the PCM samples stored in the playout buffer and defines a lower scale ratio for a longer PCM length.

3. The method of claim 1, wherein the setting of the first scale ratio comprises:
    checking a number of queued packets being received;
    confirming a scale ratio corresponding to the number of the queued packets and the length of the PCM samples in the scale ratio table; and
    setting the confirmed scale ratio as the first scale ratio.

4. The method of claim 3, wherein the scale ratio table defines a higher scale ratio for a shorter length of the PCM samples stored in the playout buffer and a smaller number of the queued packets, and defines a lower scale ratio for a longer length of the PCM samples and a greater number of the queued packets.

5. The method of claim 1, wherein the setting of the final scale ratio comprises:
    applying weights to the first scale ratio and the second scale ratio, respectively; and
    summing the weighted first scale ratio scale ratio and the weighted second scale ratio.

6. An apparatus for playout scheduling at a receiver in a Voice over Internet Protocol (VoIP) system, comprises:
    a decoder for acquiring Pulse Code Modulation (PCM) samples by decoding a received packet;
    a first scale ratio setter for setting a first scale ratio according to a length of PCM samples stored in a playout buffer based on a preset scale ratio table;
    a second scale ratio setter for setting a second scale ratio by predicting a packet delay;
    a final scale ratio setter for setting a final scale ratio using the first scale ratio and the second scale ratio; and
    a packet size regulator for adjusting a length of the acquired PCM samples at the final scale ratio.

7. The apparatus of claim 6, wherein the scale ratio table defines a higher scale ratio for a shorter length of the PCM samples stored in the playout buffer and defines a lower scale ratio for a longer PCM length.

8. The apparatus of claim 6, wherein the first scale ratio setter checks a number of queued packets being received, confirms a scale ratio corresponding to the number of the queued packets and the length of the PCM samples in the scale ratio table, and sets the confirmed scale ratio as the first scale ratio.

9. The apparatus of claim 8, wherein the scale ratio table defines a higher scale ratio for a shorter length of the PCM samples stored in the playout buffer and a smaller number of the queued packets, and defines a lower scale ratio for a longer length of the PCM samples and a greater number of the queued packets.

10. The apparatus of claim 6, wherein the final scale ratio setter applies weights to the first scale ratio and the second scale ratio, respectively, and determines the final scale ratio by summing the weighted first scale ratio and the weighted second scale ratio.

* * * * *